United States Patent
Keshet et al.

(10) Patent No.: US 9,032,536 B2
(45) Date of Patent: May 12, 2015

(54) SYSTEM AND METHOD FOR INCAPACITATING A HARDWARE KEYLOGGER

(75) Inventors: Ido Keshet, Zichron Yaakov (IL); Pavel Berengoltz, Petah-Tikva (IL); Leonid Dorrendorf, Maale Adumin (IL)

(73) Assignee: Safend Ltd., Tel Aviv (IL)

( * ) Notice: Subject to any disclaimer, the term of this patent is extended or adjusted under 35 U.S.C. 154(b) by 154 days.

(21) Appl. No.: 13/123,207

(22) PCT Filed: Oct. 11, 2009

(86) PCT No.: PCT/IL2009/000969
§ 371 (c)(1),
(2), (4) Date: Apr. 7, 2011

(87) PCT Pub. No.: WO2010/041257
PCT Pub. Date: Apr. 15, 2010

(65) Prior Publication Data
US 2011/0219457 A1   Sep. 8, 2011

Related U.S. Application Data

(60) Provisional application No. 61/104,385, filed on Oct. 10, 2008.

(51) Int. Cl.
G06F 21/04   (2006.01)
G06F 21/83   (2013.01)

(52) U.S. Cl.
CPC ........ G06F 21/83 (2013.01); *G06F 2221/2101* (2013.01)

(58) Field of Classification Search
CPC .............. G06F 21/10; G11B 20/00086; H04L 63/0428
USPC .......................................................... 726/26
See application file for complete search history.

(56) References Cited

U.S. PATENT DOCUMENTS

| | | | |
|---|---|---|---|
| 7,328,457 B1 | 2/2008 | Mister | |
| 8,204,984 B1 * | 6/2012 | Aziz et al. | 709/224 |
| 8,528,082 B2 | 9/2013 | Jiang | |
| 2004/0215971 A1 * | 10/2004 | Nam | 713/200 |
| 2006/0101128 A1 * | 5/2006 | Waterson | 709/212 |
| 2007/0169191 A1 * | 7/2007 | Greene et al. | 726/22 |
| 2007/0234061 A1 * | 10/2007 | Teo | 713/178 |
| 2007/0240212 A1 * | 10/2007 | Matalytski | 726/22 |

(Continued)

FOREIGN PATENT DOCUMENTS

| | | |
|---|---|---|
| CN | 101101625 | 1/2008 |
| WO | WO 2006/033531 | 3/2006 |

OTHER PUBLICATIONS

International Search Report of Application No. PCT/IL09/00969 mailed on Jan. 28, 2010.

(Continued)

*Primary Examiner* — Yonas Bayou
(74) *Attorney, Agent, or Firm* — Baker Botts L.L.P.

(57) ABSTRACT

A system, device and method for incapacitating a keylogger. An inactivity of an input device may be detected. A flow of information from an input device to a computing device may be manipulated. A keylogger may be caused to store redundant information by causing the input device to produce redundant input. Other embodiments are described and claimed.

12 Claims, 2 Drawing Sheets

(56) References Cited

U.S. PATENT DOCUMENTS

| | | | |
|---|---|---|---|
| 2007/0245343 A1* | 10/2007 | Shannon et al. | 717/174 |
| 2008/0028441 A1* | 1/2008 | Novoa et al. | 726/4 |
| 2008/0189790 A1* | 8/2008 | Park | 726/26 |
| 2009/0066543 A1* | 3/2009 | Delia et al. | 341/23 |
| 2009/0187991 A1* | 7/2009 | Freericks et al. | 726/24 |
| 2009/0271866 A1* | 10/2009 | Liske | 726/23 |

OTHER PUBLICATIONS

European search report mailed on Oct. 7, 2013 for European application No. 09818878.

* cited by examiner

SYSTEM AND METHOD FOR INCAPACITATING A HARDWARE KEYLOGGER

CROSS-REFERENCE TO RELATED APPLICATIONS

This application is a National Phase Application of PCT International Application No. PCT/IL2009/000969, International Filing Date Oct. 11, 2009, entitled "SYSTEM AND METHOD FOR INCAPACITATING A HARDWARE KEYLOGGER", published on Apr. 15, 2010 as International Publication Number WO 2010/041257 claiming priority of U.S. Provisional Patent Application No. 61/104,385 filed Oct. 10, 2008, both of which are incorporated herein by reference in their entirety.

BACKGROUND OF THE INVENTION

Hardware keyloggers are hardware devices typically installed between an input device such as a keyboard or a magnetic card swipe reader and a computing device. Hardware keyloggers may be used to record key strokes performed by a user operating and/or interacting with a computing device. Although hardware keyloggers may be used for purposes such as statistics gathering or activity recording they may also, under various circumstances, pose a substantial security threat.

Hardware keyloggers may be used for industrial espionage, for example by installing them in computers of a competing company or they may be used for fraudulent activities, for example, to obtain personal information such as user name, password etc.

One of the problems encountered when dealing with the security threat posed by hardware keyloggers is detecting them. For example, a keylogger may be hidden inside a computer's keyboard. Alternatively, a keylogger may be very small in size and when installed on a backend of a computer may be hard to notice or detect.

There is a need for a system, device and/or method for eliminating the security threat posed by hardware keyloggers.

SUMMARY OF EMBODIMENTS OF THE INVENTION

Embodiments of the invention may determine an input device is inactive. The flow path of information from the input device to entities such as an operating system operating an associated computing device may be manipulated such that information from the input device can not reach its target destination. The input device may be caused to produce redundant, meaningless information. Such information may be stored in an associated keylogger and may further exhaust the storage capacity or other resources of such keylogger thus hindering, impeding or obstructing attempts to capture and/or record user key strokes.

BRIEF DESCRIPTION OF THE DRAWINGS

Embodiments of the invention are illustrated by way of example and not limitation in the figures of the accompanying drawings, in which like reference numerals indicate corresponding, analogous or similar elements, and in which.

It will be appreciated that for simplicity and clarity of illustration, elements shown in the figures have not necessarily been drawn to scale. For example, the dimensions of some of the elements may be exaggerated relative to other elements for clarity.

DETAILED DESCRIPTION OF EMBODIMENTS OF THE INVENTION

In the following detailed description, numerous specific details are set forth in order to provide a thorough understanding of the invention. However, it will be understood by those of ordinary skill in the art that the invention may be practiced without these specific details. In other instances, well-known methods, procedures, components, modules, units and/or circuits have not been described in detail so as not to obscure the invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. For example, "a plurality of stations" may include two or more stations.

Unless explicitly stated, the method embodiments described herein are not constrained to a particular order or sequence. Additionally, some of the described method embodiments or elements thereof can occur or be performed at the same point in time.

Figure 1:
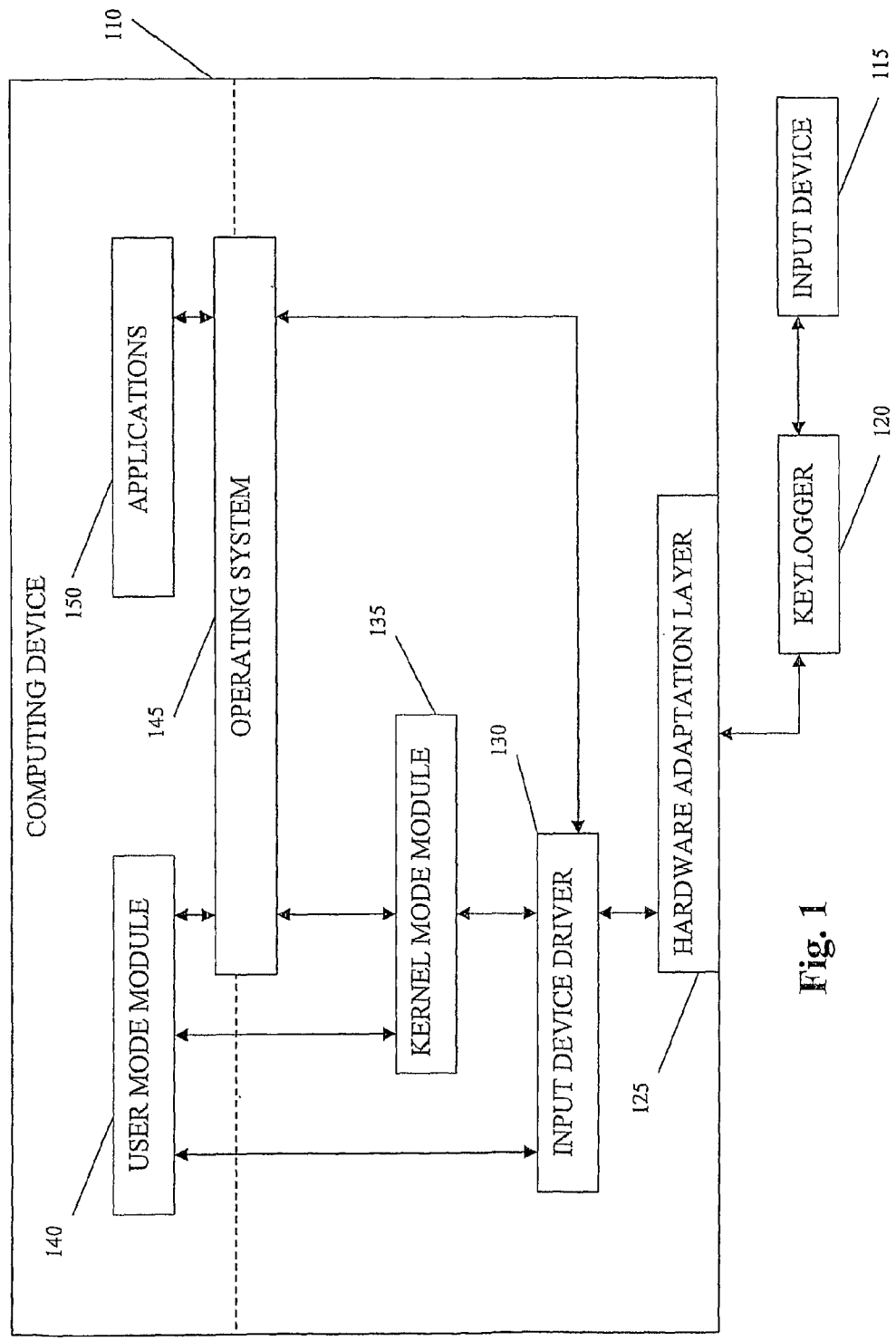
FIG. 1 shows an exemplary system according to embodiments of the invention.

Reference is made to FIG. 1 showing an exemplary system according to embodiments of the invention. According to embodiments of the invention, computing device 110 may include components such as, but not limited to, a plurality of central processing units (CPU) or any other suitable multipurpose or specific processors or controllers, a plurality of input units or devices, a plurality of output units or devices, a plurality of memory units, and a plurality of storage units. Computing device 110 may additionally include other suitable hardware components and/or software components. In some embodiments, computing device 110 may include or may be, for example, a personal computer, a desktop computer, a mobile computer, a laptop computer, a notebook computer, a terminal, a workstation, a server computer, a Personal Digital Assistant (PDA) device, a tablet computer, a network device, a thin client or any other suitable computing device.

According to embodiments of the invention, input device 115 may be any suitable input device. For example, input device may be a keyboard, a touch screen, a magnetic card swipe reader, e.g. credit card reader, a point and click device, e.g., a mouse or it may be a device uploading content to computing device 110, e.g., a digital camera or an external drive. According to embodiments of the invention, input device 115 may be any input device, the input of which may be logged and/or stored by a keylogger. According to embodiments of the invention, input device 115 may be a wired input device or it may be a wireless input device, e.g., a wireless keyboard or mouse.

According to embodiments of the invention, keylogger 120 may be any device or module capable of capturing and/or storing input provided by input device 115. According to embodiments of the invention, keylogger 120 may be connected between computing device 110 and input device 115 by disconnecting input device 115 from computing device 110, connecting keylogger 120 to computing device 110 using the same connection port or jack used for connecting input device 115 and connecting input device 115 to keylogger 120. According to other embodiments of the invention, keylogger 120 may be incorporated into input device 115. For example, keylogger 120 may be incorporated and/or hidden in a keyboard, producing what is known in the art as a "trojan keyboard". Although keylogger 120 shown in FIG. 1 is shown located outside computing device 110, According to embodiments of the invention, keylogger 120 may be fitted or installed inside computing device 110. Although FIG. 1 shows keylogger 120 as an external device, embodiments of the invention are not limited in this regard. According to embodiments of the invention, keylogger 120 may be any module capable of obtaining input provided by input device 115. For example, keylogger 120 may be a software module configured to trap intercept, record, store and/or communicate to a remote computing device input from input device 115.

According to embodiments of the invention, hardware adaptation layer 125 may be any hardware and/or firmware required in order to operatively connect input device 115 with computing device 110. For example, layer 125 may comprise power supply circuits, physical adaptation components and/or logic required to implement communication protocols. According to embodiments of the invention, input device driver 130 may be a software module configured to interface with and/or operate hardware adaptation layer 125. Input device driver 130 may further assume the task of receiving information and/or data from input device 115 and further provide such information or data to entities in computing device 110. For example, input device driver 130 may provide information or data received from input device 115 to operating system 145 as indicated by the arrow connecting block 130 and 145. According to embodiments of the invention, input device driver 130 may also perform the task of communicating, via layer 125, information, data and/or commands to input device 115. For example, input device driver 130 may communicate data and/or commands from operating system 145 or applications 150 to input device 115 as indicated by the arrow connecting block 130 and 145.

According to embodiments of the invention, operating system (OS) 145 may be any suitable operating system capable of operating computing device 110. For example, operating system 145 may be a Windows™ OS, a Windows CE™ OS, a Linux OS, Palm OS™, Solaris™ OS, MAC OS™, a micro kernel or any other suitable OS. Applications 150 may be any applications, processes, programs, scripts, threads or any other executable software and/or firmware. For example, a number of instances of a word processing application such as Word™, an internet surfing or browsing application or any other suitable application capable of executing on computing device 110.

According to embodiments of the invention, user mode module 140 may be a software module configured to interact with other modules such as kernel module 135, input device driver 130 and/or operating system 145. According to embodiments of the invention and as indicated by the arrow connecting blocks 140 and 145, user mode module 140 may be configured to receive or otherwise obtain information from operating system 145. For example, user mode module may be notified by operating system 145 when a screen saver is activated. Such information may be interpreted as an indication of lack of user activity or lack of user interaction with computing device 110, e.g., user has not pressed any key on a keyboard or moved a mouse for a predefined period of time. Alternatively, user mode module 140 may be configured to receive or otherwise obtain information from kernel module 135. Such information may be destined or otherwise related to operating system 145 and may be intercepted by kernel module 135 and provided to user mode module 140. For example, information pertaining to an operational state of computing device 110, e.g., an initiation of a shutdown procedure, an entry to a power save mode or a hard disk sleep state initiation may be provided to user mode module 140. Such information may be used, for example to predict an inactivity period. For example, it may be assumed that if a shutdown procedure has been initiated then user input may no longer be provided. According to embodiments of the invention, upon determining a period of inactivity and/or lack of user interaction with computing device 110 as described herein, input device 115 may be caused to produce meaningless information that may be stored in keylogger 120 thus exhausting storage capacity of keylogger 120.

According to embodiments of the invention, by means described herein or other means, module 140 may be able to determine whether input device 115 is producing input or not. For example, module 140 may be capable of being notified or be otherwise made aware of one or more of applications 150 beginning to execute and/or terminating an execution. Additionally, according to embodiments of the invention, module 140 may be capable of being notified or be otherwise made aware of any applicable events associated with applications 150 and/or operating system 145. For example, module 140 may be capable of determining that a screen saver application has begun rendering random information on a display of computing device 110.

According to embodiments of the invention, identifying a period of inactivity may be performed by kernel module 135. For example, kernel mode module 135 may receive information from input driver 130 and may use such information to identify periods of inactivity. For example, if kernel mode module 135 does not receive from input device driver 130 an indication that input from input device 115 was received during a predefined period of time module 135 may determine that an inactivity period is in effect. Kernel mode module may further determine that a period of inactivity has ended by detecting that input was received from input device 115, for example, module 135 may be notified by driver 130 that such input was received and may accordingly determine that a user is interacting with computing device 110. Alternatively, kernel mode module may be notified by or otherwise obtain from operating system 145 of any input, e.g., key strokes or mouse moves received by operating system 145 from input device 115. Kernel mode module may use such information or input as described herein in order to determine whether a user is interacting with computing device 110.

According to embodiments of the invention, a filter driver on human interfaces devices may be used to obtain any applicable information that may be required in order to detect user inactivity for some pre-defined period. Such filter driver may be incorporated in a logical pass of input from input devices to an operating system or other entities. In some embodiments of the invention, module 135 may be or may comprise a filter driver over input device driver 130 and may thus obtain any information that may be used to determine an inactivity period of input device 115. For example, any input received by driver 130 may be provided to kernel mode module 135 and may be used to determine aspects of input from input device 115, for example, if input is provided from input device 115.

According to embodiments of the invention, such or other indication associated with a screen saver or other application or state of computing device 110 may be used to determine that for a past predefined period of time, input device 115 did not produce any input. Accordingly, it may be assumed that input device 115 will not produce input within a very short period of time. According to embodiments of the invention, module 140 may be capable of determining periods of inactivity that may be associated with input device 115.

It will be recognized that the above screen saver scenario is an exemplary method by which module 140 may determine that a time slot or a period of time when input device 115 is not providing any input to computing device 110 exists or is about to exist. For example, a shutdown or an enter into sleep-state of various peripheral or internal resources associated with computing device 110 may be detected. Such exemplary devices may be a hard drive or disk, a display, a network card or any other applicable device. According to embodiments of the invention, events such as a shutdown of a hard disk may be used to determine that input device 115 is idle or is in a state such as inactive, inoperative, unoccupied or unused.

Another example may be a detection of an initiation of a shutdown procedure of operating system 145. According to embodiments of the invention, the period of time it takes for operating system 145 to shutdown may also be used by embodiments of the invention as will be described below. Any other suitable time slots or periods may be detected by module 140. According to embodiments of the invention, kernel mode module 135 may be a firmware module, a software module or any combination of the preceding and may further be or comprise a filter driver, hooking software, any other software module capable of intercepting or otherwise obtaining information from input device 115, e.g., key strokes or mouse moves. kernel mode module 135 may also be capable of sending commands, data or any other information to input device 115.

According to embodiments of the invention and as indicated by the arrows connecting block 135 with blocks 130, 140 and 145, kernel mode module 135 may be capable of interacting with input device driver 130, user mode module 140 and operating system 145. According to embodiments of the invention, kernel mode module 135 may interact with OS 145 and/or driver 130 in similar ways to those described herein with reference to user mode module 140. Additionally, module 135 may be configured to communicate with input device 115. For example, module 135 may provide driver 130 with information, data or commands to be sent or otherwise communicated to input device 115, for example, via hardware adaptation layer 125.

According to embodiments of the invention, module 135 may issue a command to input device 115 that may cause input device to produce input to computing device 110. For example, the command "F2h" may cause a keyboard to reply with a two byte identifying parameter. According to embodiments of the invention, module 135 may repeat issuing such or other commands any number of time, thus causing input device 115 to produce, possibly the same, information over and over. According to embodiments of the invention, such redundant, meaningless or useless information may be stored in a memory of keylogger 120. According to embodiments of the invention, such storage may deplete, exhaust or otherwise compromise the storage resources and/or other resources available to keylogger 120. Accordingly, due to lack of storage capacity, keylogger 120 may be unable to store or otherwise record information or input provided by input device 115, and may thus become inoperative.

According to embodiments of the invention, the logic or parameters controlling the rate or speed at which commands are issued, sent or communicated to input device 115 from module 135 may be configurable. For example, module 135 may send a command that causes device 115 to produce input every one millisecond, or it may send 100 commands every one millisecond. Such rate parameter may depend on the time required for input device 115 to receive the command, return a reply and for keylogger 120 to store the reply. Alternatively, module 135 may be notified by driver 130 or be otherwise aware that a reply or input from input device 115 has been received by driver 130. According to embodiments of the invention, upon being made aware a reply has been received from input device 115, module 135 may issue a new command, possibly identical to the previous command issued.

According to embodiments of the invention, module 135 may issue commands to input device 115 as described above when input device 115 is otherwise idle or is in a state such as inactive, inoperative, unoccupied or unused. For example, upon detecting an inactivity or idle period of time as described above with reference to module 140, module 140 may notify module 135. According to embodiments of the invention, upon being notified or otherwise made aware of such inactivity, module 135 may commence to issue commands to input device 115. Accordingly, when module 140 detects, for example by ways described above, that input device 115 is producing or is about to produce input that is not associated with commands issued by module 135, module 140 may notify module 135 and accordingly, module 135 may stop issuing commands to input device 115.

According to embodiments of the invention, the ability to detect user or other inactivity and cause input device 115 to produce meaningless input only during such time is highly desirable since such redundant, meaningless information, if produced while a user is operating, or otherwise interacting with computing device 110 may disable such user from properly operating computing device 110. According to embodiments of the invention, the operations described above may be performed unnoticed, and without otherwise interfering with a user interacting with computing device 110.

According to embodiments of the invention, an input device may be caused to produce redundant, meaningless or otherwise useless information while a user is using the input device. Although some embodiments of the invention may cause an input device to produce and/or send redundant or useless information only during inactivity periods as described herein, other embodiments of the invention may cause an input device to produce and send such useless or random information while input related to user activity is being communicated or sent to the relevant computing device. For example, user input and meaningless, random information may be sent concurrently or simultaneously from input device 115. According to embodiments of the invention, user input may be distinguished and/or separated from random useless information by various modules, e.g., kernel mode module 135 as described herein. Keylogger 120, unable to distinguish useless or random information from user input related information, may record both user input related information and random, useless information received from input device 115. User input related information may be routed or provided to its destination, e.g., operating system 145 or one of applications 150 while random useless information may be discarded. For example, kernel mode module 135 may perform such routing and discard operations.

According to embodiments of the invention, a storage in the input device, e.g., an internal memory buffer or chip, may be used to store random or useless information and, subsequent to such storing, the input device may be commanded to transmit the useless information stored in such memory to the attached computing device. According to embodiments of the invention, the input device may send the useless information from the storage described herein at the same time real user input is being sent. Accordingly, at the computing device, the received information stream from the input device may be analyzed and the useless information may be separated from other received information. The useless information may be discarded while other information received from the input device may be routed to its destination, e.g., an application or an operating system. For example, some keyboard models may comprise a memory that may be used to buffer output. Such memory output buffer may be used to store random byte sequences or any other random or useless information. Such keyboards may further be caused to transmit the contents of such buffer to the attached computing device, for example, upon receiving a special command.

According to embodiments of the invention, information stored on the input device as described herein may be selected according to various criteria or heuristics. For example, some embodiments may store a password or other parameter that when received by a keylogger causes the keylogger to assume a specific state or mode. For example, a keylogger may be configured to assume or enter an idle state or mode, an administrative operational state or a configuration state or mode when it receives a specific parameter, e.g., a password.

In many cases, while in such state or mode, a keylogger may not record any data received from connected devices. Accordingly, embodiments of the invention may store such password in an input device and further cause the input device to send such password to the keylogger as described above. Consequently, upon receiving such password, a keylogger may stop recording received information. A password for causing a keylogger to enter a specific state as described herein may be secret but may be obtained by means that may be beyond the scope of the present invention. Alternatively, heuristics or logic may be used by embodiments of the invention in attempting to guess the password. Any known in the art techniques for password guessing may be used by embodiments of the invention without departing from the scope of the present invention.

According to embodiments of the invention and as described herein, computing device 110 may comprise a processor. Accordingly, input device driver 130, kernel mode module 135, user mode module 140, operating system 145 and applications 150 may be executed by such processor.

Figure 2A:
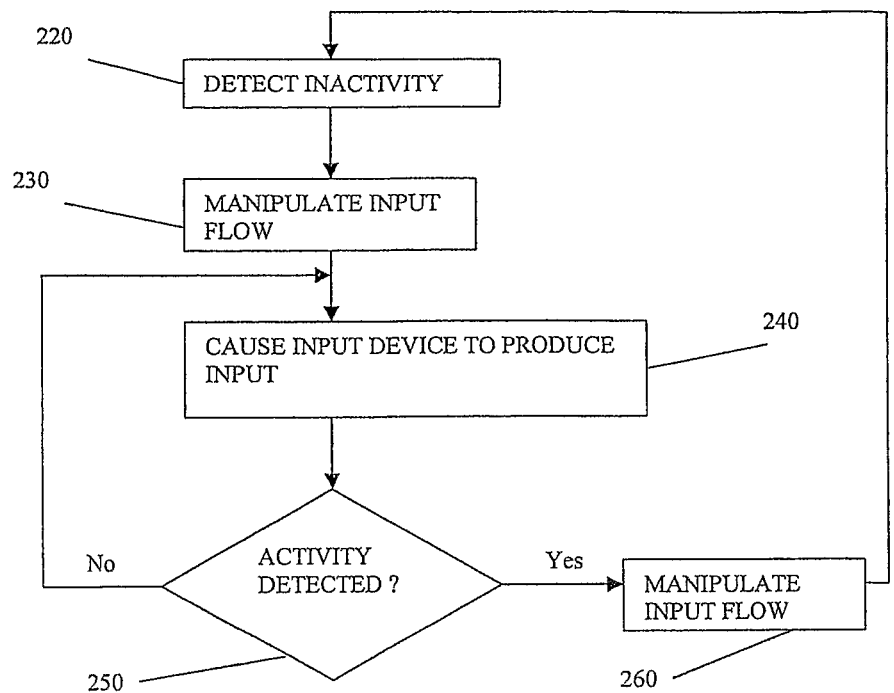
FIG. 2A shows an exemplary flowchart according to embodiments of the invention.
Figure 2B:
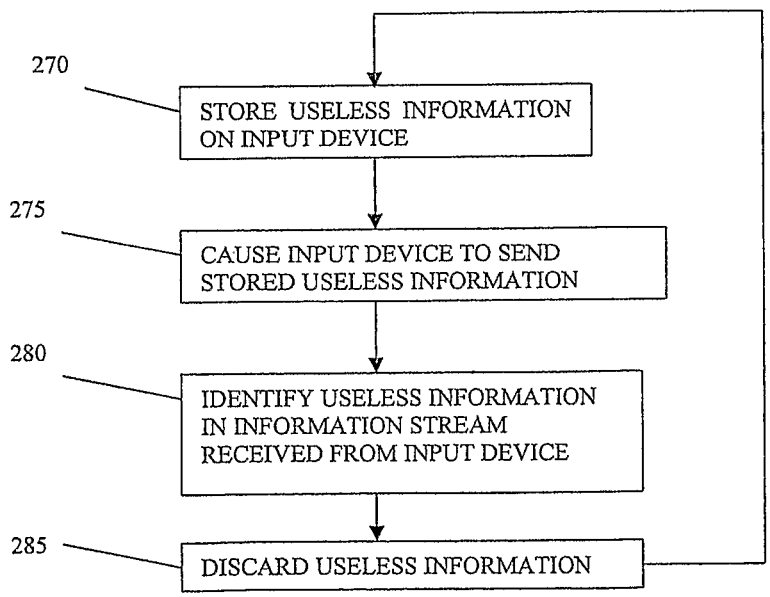
FIG. 2B shows an exemplary flowchart according to embodiments of the invention.

Reference is made to FIG. 2B showing an exemplary flowchart that may be followed according to embodiments of the invention. According to embodiments of the invention and as shown by block 270, the flow may include storing useless information in an input device. For example, kernel mode module 135 may store useless information on input device 115, for example, in a buffer as described herein. Such useless information may be selected according to various criteria. For example, the information may be chosen such that it may be easily identified within or distinguished from a regular information stream that is typically received from the relevant input device. For example, a predefined byte sequence may be used, such predefined byte sequence may appear to be a result of a user typing on a keyboard but may be easily identified by embodiments of the invention and removed from an input stream. Alternatively or additionally, useless information may be chosen such that it may be difficult for those operating the keylogger to distinguish it from regular information, for example, sequences of random bytes each representing real keyboard key presses may be chosen, however, the sequences may be predefined thus easily identified when received. Since both useless information and useable information are stored on the keylogger, it may be desirable to disable those operating the keylogger to distinguish usable, real information from dummy, useless information. Accordingly, various methods, means, heuristics or algorithms may be used for generating the useless information that is stored on the input device and subsequently received at the computing device. According to embodiments of the invention and as shown by block 275, the flow may include causing the input device to send the stored to the computing device. For example, kernel mode module 135 may cause input device 115 to communicate to computing device 110 the content stored in an output buffer. According to embodiments of the invention and as shown by block 280, the flow may include identifying the useless information received from the input device and as shown by block 285, the flow may further comprise discarding the useless information. According to embodiments of the invention, useless information may be received together with real, usable information such as real user input. Accordingly, subsequent to identifying or distinguishing the useless information, the useless information may be separated from the usable information and while the useless information may be discarded, usable information received from the input device may be routed to its destination. Tasks described herein, e.g., writing useless information to the input device, causing the input device to transmit the useless information back to the computing device, separating useless information from useable information in an information stream received from the input device and discarding the useless information may all be performed by kernel mode module 135.

Other systems and/or methods for causing a keylogger to store useless information may be enabled according to embodiments of the invention.

According to embodiments of the invention, a communication protocol packet may be generated, for example, such protocol packet may be a protocol packet used by a keyboard to communicate key strokes or other information to a computing device. The protocol packet generated may comprise a header that may comprise source and/or destination fields. According to embodiments of the invention, the source field in such header may be set to reflect an input device thus the generated packet may appear to originate at an input device. For example, the PID field in a USB protocol packet may be set so as to identify a packet as an incoming packet thus causing a keylogger to determine the packet is arriving from an input device and consequently store it.

Accordingly, when such packet is placed on a communication bus connected to a keylogger, the keylogger may determine that the packet is coming from, or originating at, an input device and may further store such packet, or data contained in such packet, thus the goal of exhausting the storage capacity of a keylogger may be achieved.

For example, in systems where a shared or other appropriate bus connects an input device such as input device 115 to a computing device such as computing device 110, a module such as kernel mode module 135 may simulate traffic from input device 115 by generating packets that may seem to originate from input device 115 and destined for computing device 110. For example, according to some protocols, the source and destination addresses of a protocol packet are stored in the packet header. Accordingly, kernel mode module 135 may generate packets containing useless but possibly known information, module 135 may additionally store a source address corresponding to input device 115 in such packet and possibly a destination address of computing device 110 or an entity, port, device or other module within computing device 110. Kernel mode module may further place such packets on a communication bus connecting input device 115. When such packets are received by keylogger 120 they may be mistakenly regarded by keylogger 120 as packets coming or originating from input device 115 and may further be stored by keylogger 120, thus kernel mode module 135 may cause keylogger 120 to store useless information and exhaust storage capacity of keylogger 120.

According to embodiments of the invention, generated packets described herein may contain a password or other parameter that may cause a keylogger to assume or enter a specific state, e.g., a configuration or administration state. As described above, a keylogger may stop or refrain from storing any data when in such state. Accordingly, embodiments of the invention may cause generated packets described above to contain such parameter or password and consequently cause a keylogger to stop or avoid storing data by causing a keylogger to enter a state as described above. Any technique for deriving, guessing or otherwise obtaining a password or parameter to cause a keylogger to enter a specific, non-recording state or mode may be used by embodiments of the invention without departing from the scope of the invention.

Reference is made to FIG. 2 showing an exemplary flowchart that may be followed according to embodiments of the invention. According to embodiments of the invention and as shown by block 220, the flow may include detecting inactivity. According to embodiments of the invention, such detection may be comprise any means, methods or applicable ways for determining that an input device is not producing input and/or is not about to produce input for some period of time or it may otherwise determine lack of input from the input device. For example, such detection may comprise detecting an invocation of a predefined application, e.g., a screen saver. According to embodiments of the invention, such detection may comprise directly monitoring the input device or it may comprise detecting other devices, software applications, operating system conditions and/or any applicable aspects of a computing device that may be used to determine, deduce and/or assume that an input device is not producing input and/or is not about to produce input.

It will be recognized that although a keyboard may be a typical example of an input device that may be associated with embodiments of the invention, any other applicable device may be associated with embodiments of the invention. According to embodiments of the invention, a keylogger installed and/or configured to track, log, capture, record or otherwise obtain information originating from a device may be incapacitated by means described herein. For example, a keylogger may collect and store information from a touch screen, a keyboard, a magnetic card swipe reader, e.g. credit card reader, a point and click device, e.g., a mouse or any other device used for interacting with a computing device.

According to embodiments of the invention and as shown by block 230, the flow may include manipulating the flow or flow path of input or other information from an input device. Such manipulation may prevent information or data from the input device to reach its otherwise target, default, previously configured or natural destination. According to embodiments of the invention, such manipulation may comprise disassociating an operating system or any other applicable entity from the input device. For example, such manipulation may comprise blocking input from reaching, or be otherwise obtained by an operating system operating the relevant computing device. For example, according to embodiments of the invention, an input from a keyboard may be prevented from being obtained by the operating system operating the relevant computing device. According to embodiments of the invention, manipulating the input flow may comprise intercepting the flow of input from an input device to a computing device. According to embodiments of the invention, such intercepted input may be examined, recorded and/or discarded before and possibly without being further provided to the operating system and accordingly, to any application, such as applications 150, executing on the computing device. For example, kernel mode module 135 operatively inserted between driver 130 and operating system 145 may perform such manipulation, for example, block passage of information between driver 130 and operating system 145. Alternatively, such manipulation may comprise configuring driver 130 to stop and/or refrain from sending to, communicating to, or otherwise providing operating system 145 with input received from input device 115.

According to embodiments of the invention and as shown by block 240, the flow may include causing an input device to produce input. According to embodiments of the invention, the input device may be caused to produce random, worthless, insignificant or unusable information or data. For example, the input device may be caused to produce information related to key strokes. For example, if the input device is a keyboard then it may be caused to produce information that would be produced when "caps lock", "shift", "Ctrl", or "Alt" or other such keys are pressed. An input device may be caused to send an identification or manufacturing code that may be stored on it by a manufacturer or, if applicable, communicate it's device activity status, statistics etc. According to embodiments of the invention, the input device may be caused to produce such information a number of times. For example, causing the input device to produce input as shown by block 240 may be causing the input device to provide it's identification code or any other parameter three, five or any other suitable number of times.

According to embodiments of the invention and as shown by block 250, the flow may include determining that the input device is inactive. According to embodiments of the invention, checking if the input device is active may be performed after causing the input device to produce input as shown by block 240 or it may be performed while or during the input device is caused to produce input. For example, module 135 may cause the input device to produce input while module 140 may determine that other than producing input as a result of commands issued by module 135, input device 115 is idle. It will be recognized that although the flow depicted in FIG. 2 shows that inactivity of an input device is determined after the input device is caused to produce input, embodiments of the invention are not limited in this regard.

For example, module 135 may continue to cause input device to produce input and may, possibly asynchronously, be notified by module 140 that input device is no longer inactive or alternatively, that input device may become active shortly. Accordingly, module 135 may, upon receiving such notification, stop causing input device to produce random input as shown by block 240. According to embodiments of the invention and as shown by block 260, possibly when detecting the input device is active, producing input and/or is about to produce input, the flow may include manipulating the input flow. Such manipulation may restore the flow of input to its original state or configuration, for example, enabling input information originating from the input device to reach an operating system or another entity.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. A system for incapacitating a hardware keylogger comprising:
   a hardware keylogger having a storage capacity, wherein the keylogger is connected between a computing device and an input device;
   wherein the computing device comprises a processor configured to:
      determine an inactivity period of the input device connected to said keylogger by detecting one of: an invocation of a predefined application and a predefined operational state of said computing device and
      during the inactivity period, cause the keylogger to store useless information and deplete the storage capacity of the keylogger until the keylogger is unable to store other information by causing said input device to:
         produce said useless information, store the useless information on the input device, and communicate said useless information from the input device to said keylogger.

2. The system of claim 1, wherein said input device is selected from the group consisting of: a human interface device, a keyboard, a magnetic card swipe reader and a point and click device.

3. The system of claim 1, further comprising:
   an operating system operating said computing device;
   wherein prior to causing said input device to produce said useless information said processor is to disassociate said input device from said operating system.

4. The system of claim 1, wherein said processor is configured to cause said keylogger to store useless information by:
   generating a packet containing useless information;
   associating said packet with said input device; and
   causing said keylogger to receive said packet.

5. The system of claim 4, wherein said packet contains a predefined parameter that when received by said keylogger causes said keylogger to assume a predefined operational state.

6. The system of claim 5, wherein said predefined operational state is one of: an idle state an administrative state and a configuration state.

7. The system of claim 1, wherein said useless information comprises a predefined parameter that when received by said keylogger causes said keylogger to assume a predefined operational state.

8. The system of claim 7, wherein said predefined operational state is one of: an idle state an administrative state and a configuration state.

9. A method for incapacitating a hardware keylogger comprising:
   determining an inactivity period of an input device connected to the hardware keylogger by detecting one of: an invocation of a predefined application and a predefined operational state of said computing device, wherein the hardware keylogger is connected between the input device and a computing device; and
   during the inactivity period, causing said hardware keylogger to store useless information and deplete the storage capacity of the keylogger until the keylogger is unable to store other information by causing said input device to produce said useless information, to store the useless information on the input device, and to communicate said useless information from the input device to said hardware keylogger.

10. The method of claim 9, wherein said input device is selected from the group consisting of: a human interface device, a keyboard, a magnetic card swipe reader and a point and click device.

11. The method of claim 9, further comprising:
   storing information on an input device associated with said keylogger; and
   causing said keylogger to store said information by causing said input device to send said information.

12. The method of claim 9, further comprising:
   receiving said information from said input device; and
   discarding said information.

* * * * *